(12) United States Patent
Chila et al.

(10) Patent No.: US 11,215,153 B1
(45) Date of Patent: Jan. 4, 2022

(54) RIM FOR SECURING A PUMP TO A TANK

(71) Applicant: RB Distribution, Inc., Colmar, PA (US)

(72) Inventors: Jeffrey Chila, Harleysville, PA (US); Adam Gaston, Ambler, PA (US); Marc McCann, Philadelphia, PA (US); Eric Tryson, Willow Grove, PA (US)

(73) Assignee: RB Distribution, Inc., Colmar, PA (US)

( * ) Notice: Subject to any disclaimer, the term of this patent is extended or adjusted under 35 U.S.C. 154(b) by 0 days.

(21) Appl. No.: 17/228,261

(22) Filed: Apr. 12, 2021

(51) Int. Cl.
    *F02M 37/10* (2006.01)
    *B60K 15/03* (2006.01)

(52) U.S. Cl.
    CPC ........... *F02M 37/103* (2013.01); *B60K 15/03* (2013.01); *B60K 2015/03243* (2013.01); *B60K 2015/03447* (2013.01)

(58) Field of Classification Search
    CPC .................. F02M 37/103; B60K 15/03; B60K 2015/03447; B60K 2015/03243
    See application file for complete search history.

(56) References Cited

U.S. PATENT DOCUMENTS

| | | | |
|---|---|---|---|
| 9,694,673 B2 * | 7/2017 | Beauchaine | ........... B60K 15/01 |
| 2007/0062841 A1 * | 3/2007 | Nakamura | ....... B60K 15/03177 |
| | | | 206/562 |

OTHER PUBLICATIONS

Two photographs from Mar. 2014 as retrieved from: https://rivperformance.editboard.com/t10875-rusty-fuel-tank-tab-repair.

* cited by examiner

*Primary Examiner* — Jacob M Amick
*Assistant Examiner* — Charles J Brauch
(74) *Attorney, Agent, or Firm* — Volpe Koenig

(57) ABSTRACT

A retaining ring for securing a pump to a tank. The ring has a circular body with an outer dimension selected to surround a pump opening in the fuel tank. An interior opening has a diameter that is selected to contact a portion of a pump housing that is placed in the tank. The retaining ring is fastened or attached directly to the tank.

15 Claims, 7 Drawing Sheets

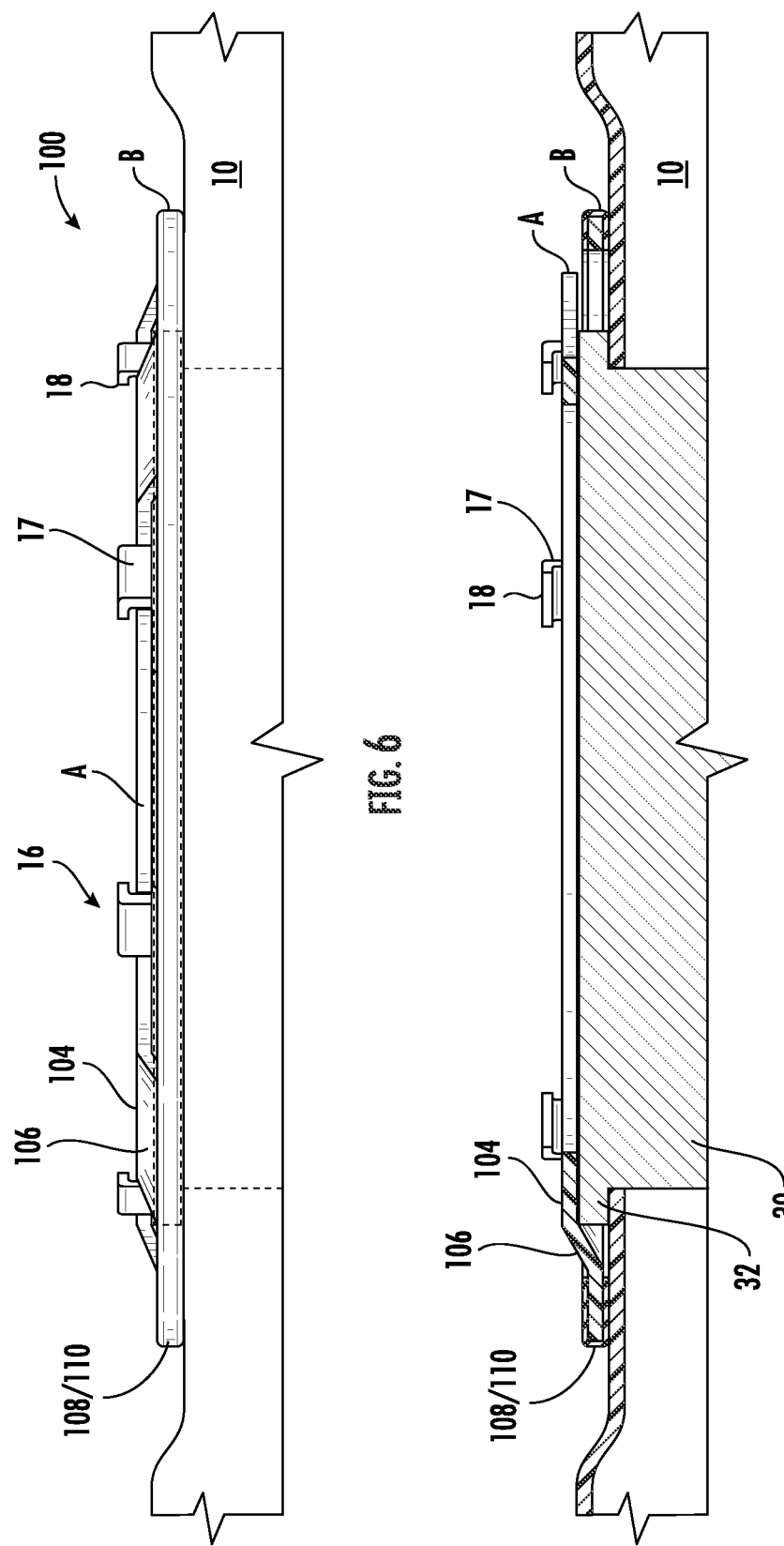

RIM FOR SECURING A PUMP TO A TANK

FIELD OF INVENTION

The invention relates generally to securing a pump to a liquid holding tank. More particularly, the relates to securing a fuel pump to a vehicle fuel tank. Most particularly, the invention related to repairing the attachment of a pump to a vehicle fuel tank where the original manufacturer's assembly rusted or broke.

BACKGROUND

In most modern vehicles, the fuel tank is a plastic molded tank that configure to fit the vehicle body. The fuel pump is assembled to the tank with a metallic ring that has an inner diameter that fits around the pump and a plurality of upstanding flanges that are defined on an outer diameter and dimensioned to engage with a plurality of tabs that extend around the outer perimeter of a retaining ring that fits over the fuel pump and a collar on the pump to secure it against the tank. Various methods of sealing against fuel leaks are generally formulated according to the specifics of the tank and fuel pump.

A problem arises when the OEM assembly experiences rust or damage that requires a repair for securing the pump to the tank. Various attempts have been made to address the repair by essentially duplicating the OEM assembly technique; however, they have been found to be difficult to accomplish and less than satisfactory.

SUMMARY

The applicant discovered that a satisfactory repair could be made by providing a retaining ring that does not engage the upstanding flanges generally associated with an original manufacturer's tank structure and is secured directly to the tank.

The disclosed retaining ring has an inner diameter that fits over the top of the pump to engage the pump's collar and a plurality of apertures that are positioned and sized to fit over the plurality of upstanding flanges on the OEM metallic ring without engaging them. The retaining ring is secured to the tank with fasteners, such as self-taping screws or bolts and nuts.

BRIEF DESCRIPTION OF THE DRAWINGS

FIG. 6 is a side view of the assembly in FIG. 5;

FIG. 7 is a section that illustrates the relationship of the pump, tank, and retaining ring in the final assembly of FIG. 5; and, FIG. 8 is a perspective view of an alternative embodiment of the retaining ring according to the invention without a gasket on the outer diameter.

DETAILED DESCRIPTION OF THE PREFERRED EMBODIMENTS

Figure 1:
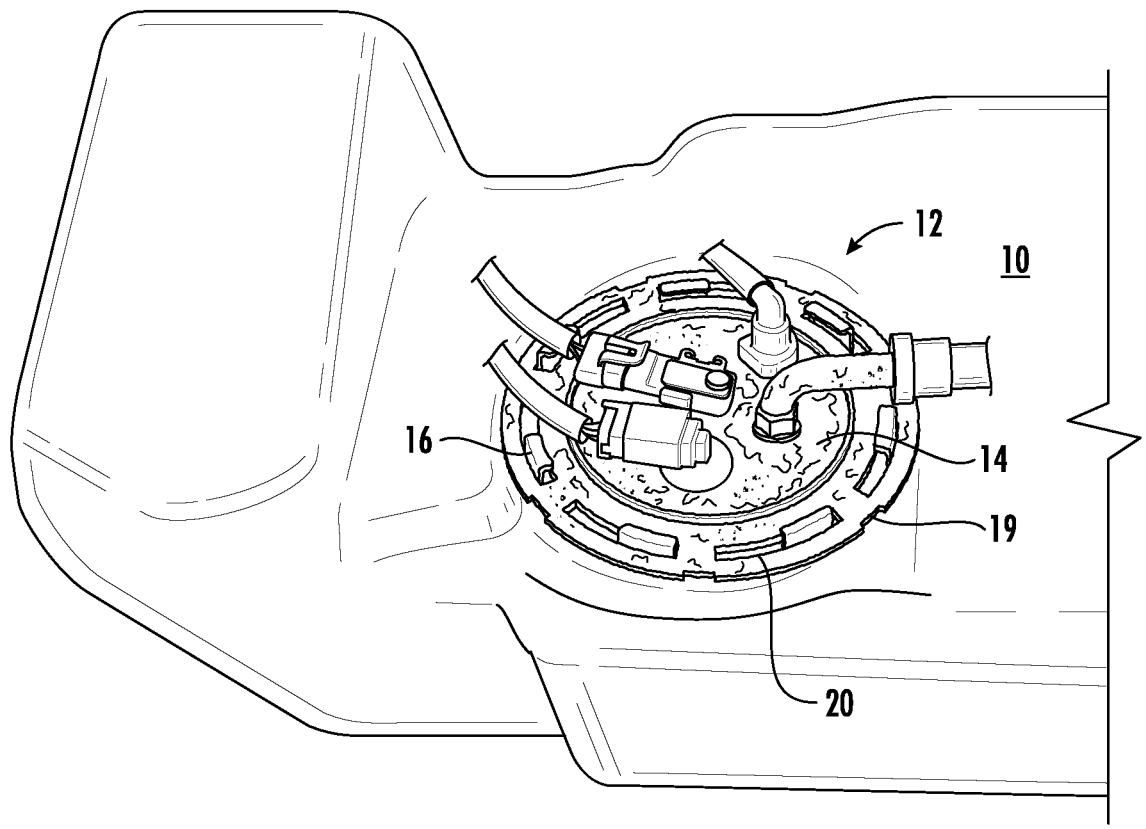
FIG. 1 is an illustration showing the environment of the pump assembled to a representative fuel tank with the original manufacturer's assembly ring.

With reference to FIG. 1, a prior art fuel pump assembly 12 is illustrated on a representative tank 10. The pump 14 is secured to the tank by the upstanding flanges 16, which are part of the tank assembly, and a retaining ring 19. Each of the flanges 16 have a generally horizontal upper portion 18 that is bent inwardly from the vertical portion 17. The prior art retaining ring 19 has a plurality of slots 20 that have a notched portion that passes over the horizontal portion 18 and a narrower slot that passes around the vertical portion 17 and locks under the upper portion 18.

Figure 2:
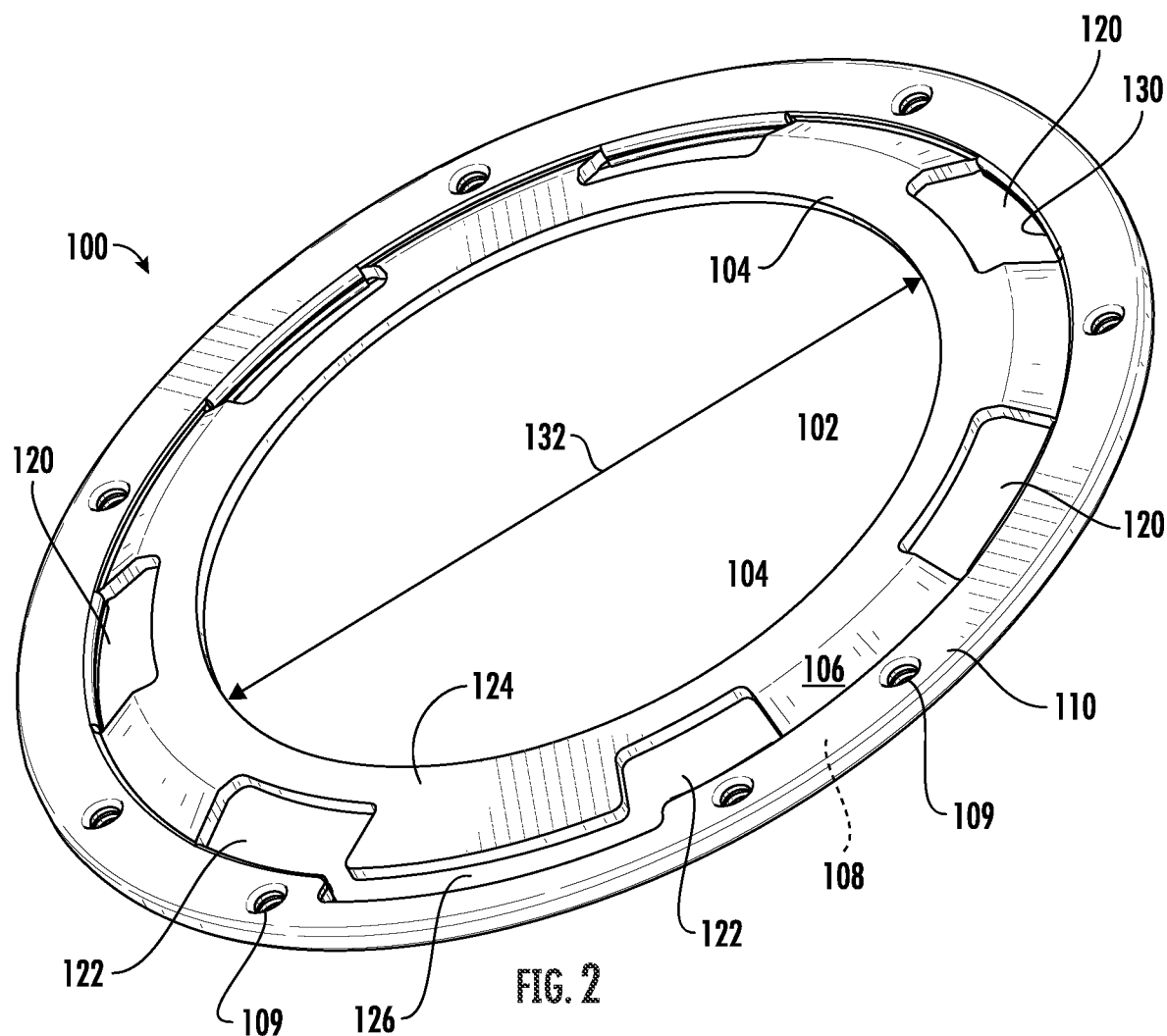
FIG. 2 is a perspective view of a retaining ring according to the invention with a gasket on the outer diameter.
Figure 8:
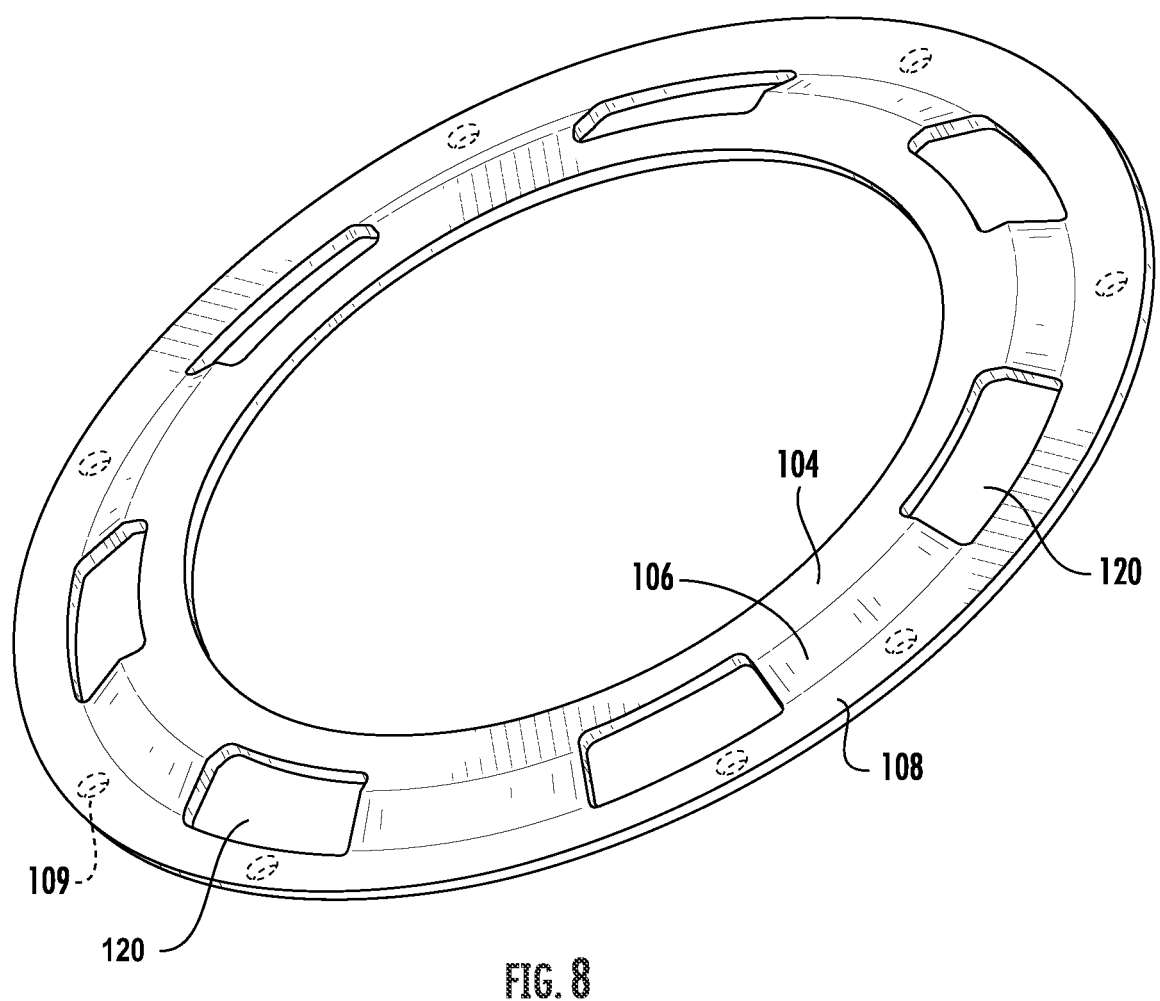

With reference to FIG. 2, it illustrates a preferred embodiment of the retaining ring assembly 100. The preferred retaining ring has a ring 102 that is comprised of an inner or upper portion 104, and intermediate portion 106 and an outer or lower portion 108. The outer portion 108 has a plurality of preformed fastener holes for screws or bolts. Preferably, a resilient gasket 110 is fitted to the lower portion as illustrated; however, the retaining ring may be utilized without the gasket as illustrated in FIG. 8. The preferred embodiment has openings 120 and 122 that are dimensioned to fit over the horizontal upper portion 18 of the existing flanges 16 on the tank 10.

The openings 120 and 122 differ in that the intermediate portion 124 between the openings 122 is cantilevered from the inner portion and separated from the lower portion 108 by the relief or notch 126 in outer portion 108. This configuration with the relief 126 accommodates some pump assemblies that include electronic assemblies that may interfere with proper setting of the retaining ring on the tank. In those applications where there is no concern about interference, the relief 126 is not necessary and the openings 120 and the sections of intermediate portion 106 between the openings 120 can be uniform.

Figure 3:
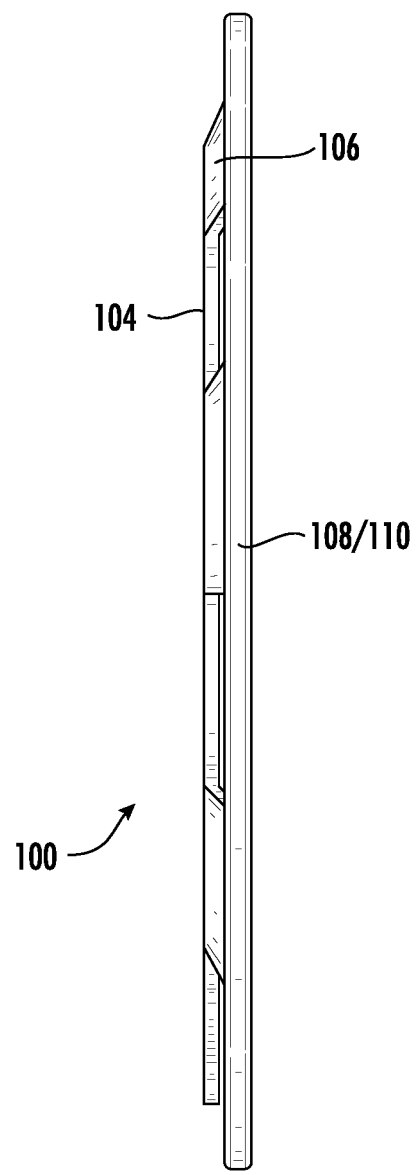
FIG. 3 is a side view of the retaining ring in FIG. 2.

With reference to FIG. 3, it can be seen from this side view of the ring assembly 100 that the upper portion 104 is in one plane, the lower portion 108/110 is in a second plane and the intermediate portion 104 is an angular extension that extends inwardly between the upper and lower portions. In the preferred embodiment, the upper portion and the lower portion are in parallel planes and the upper portion 104 is located inwardly and has a smaller diameter than the diameter of the lower portion 108.

Figure 4:
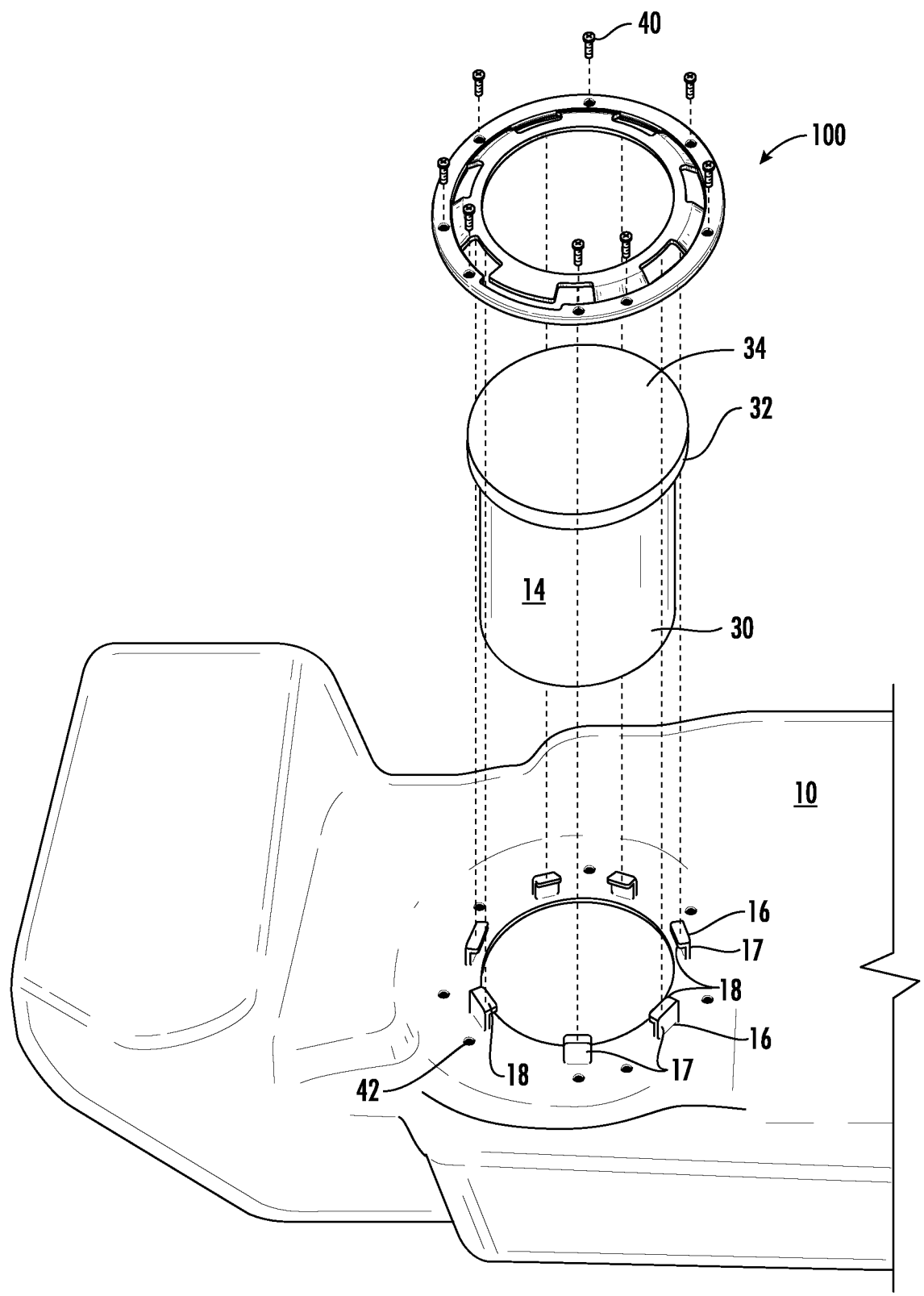
FIG. 4 is an exploded view illustrating the assembly of a pump to a tank with the present retaining ring.

With reference to FIG. 4, the assemble of a pump to a tank with the present retaining ring is illustrated. The body 30 of pump 14 is lowered into the tank through an opening that is dimensioned to admit the body but have the lip or collar 32 on the rest on the tank around the opening. The top 34 of pump 14 extends above the lip or collar 32. The retaining ring has an inner diameter 130 that is dimensioned to be outside of the plurality of flanges 16 so that the openings 120 and 122 pass over the flanges 16. upper portion 104 has an inner diameter 132 that is dimensioned to pass around the top 34 of pump 14 and rest on the lip or collar 32. Fasteners, such as self-tapping screws 40, secure the retaining ring to the tank and the gasket 110 forms a seal. If desired, the tank 10 may be drilled to form bore holes 42 for bolts that will receive nuts to hold the retaining ring in place. If bolts are used, it is preferred to push them up through the holes 42 and use a fuel tolerant caulking compound that will hold them in place for the installation of the retaining ring.

Figure 5:
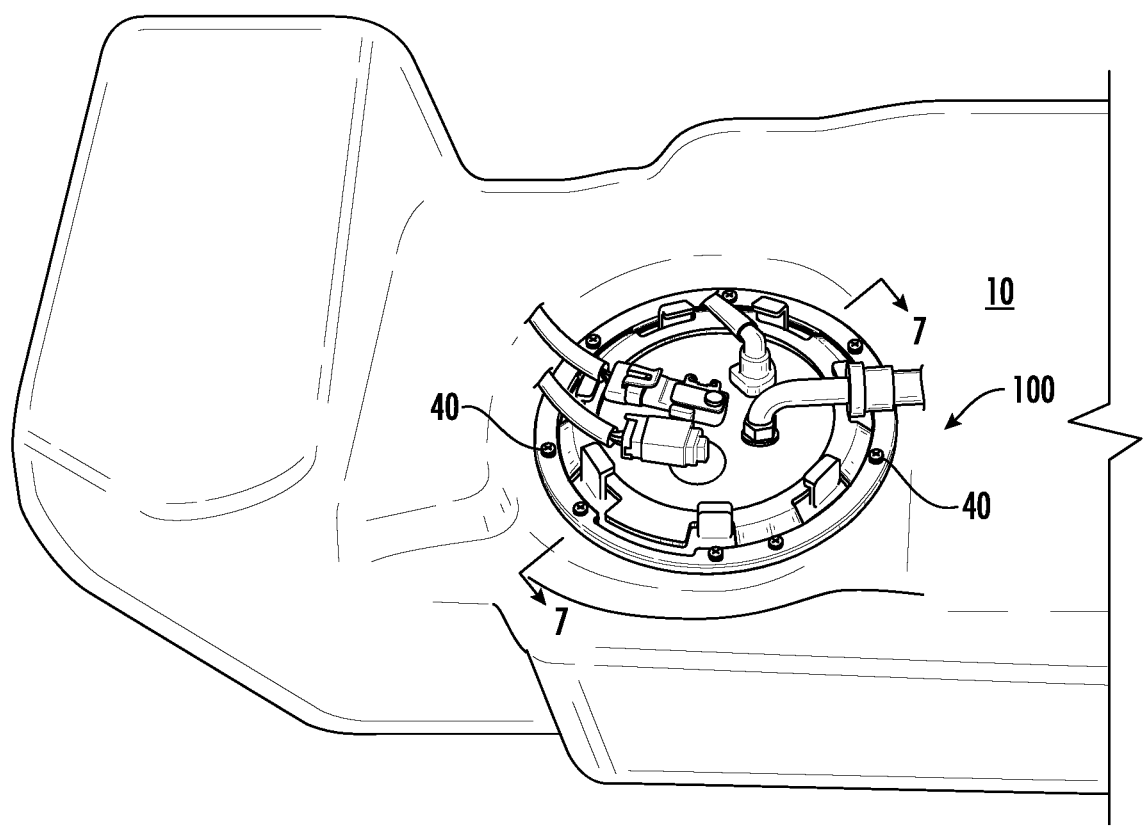
FIG. 5 illustrated an final assembly using the present retaining ring.

With reference to FIG. 5, a repair using the present retaining ring is illustrated.

With reference to FIG. 6, it is a side view showing the upper portion 104 in plane A, the lower portion in plane B, and the angular intermediate portion 104.

With reference to FIG. 7, it is a section view showing the contact between the upper portion 104 and the lip or collar 32.

With reference to FIG. 8, there is illustrated an alternative embodiment without a gasket. This embodiment does not have separated intermediate portion 124 and the openings 120 are uniform throughout the retaining ring.

What is claimed is:

1. A retaining ring for securing a pump to a container, the retaining ring comprising:
   a circular body having an outer portion with an inner diameter dimensioned to surround a pump opening in the container, and a radially extending inner portion that is connected to the outer portion and defines an opening with a diameter that is less than the pump opening and dimensioned to contact a pump housing dimensioned to fit within the pump opening;
   the radially extending inner portion has a plurality of apertures that are defined adjacent to the outer portion of the circular; and
   the outer portion is secured directly to the container.

2. A retainer for securing a puma to a container having an existing pump securing structure, the retainer comprising:
   a unitary circular body with an outer ring with a first diameter that includes a plurality of apertures for fastening the outer ring to the container; an inner ring with a second diameter that is less than the first diameter and is selected to contact a portion of a pump housing; and, a radially extending intermediate portion that connects to the outer ring and the inner ring portion;
   wherein the radially extending intermediate portion defines a plurality of apertures that are positioned to pass over the existing pump securing structure when the outer ring secured directly to the container.

3. The retaining ring of claim 2 wherein, the outer portion is in a first plane and the inner portion is in a second plane.

4. The retaining ring of claim 3 wherein, the first plane and the second plane are parallel planes.

5. The retaining ring of claim 3, wherein the intermediate portion in angularly disposed between the first plane and the second plane.

6. The retaining ring of claim 2 wherein, a section of the intermediate portion between apertures is separated from the outer portion.

7. The retaining ring of claim 2 wherein, the outer portion has a plurality of fastener apertures.

8. The retaining ring of claim 2 further comprising a seal for the outer portion.

9. A retaining ring for securing a pump to a container having an existing pump securing structure, the retaining ring comprising:
   a unitary circular body having an outer portion having a dimension larger than the container opening to surround the tank opening, an inner portion dimensioned to engage a portion of a housing associated with a pump located in the container opening, and a radially extending intermediate portion that extends between the outer portion and the inner portion;
   wherein the radially outer portion is secured directly to the container independently of any existing pump securing structures.

10. The retaining ring of claim 9 wherein, the radially extending intermediate portion defines a plurality of apertures between the outer portion and the inner portion.

11. The retaining ring of claim 10 wherein, the plurality of apertures between the outer portion and the inner portion are uniform.

12. The retaining ring of claim 10 wherein, a relief is formed in the outer portion to define a cantilevered section in the intermediate portion.

13. The retaining ring of claim 10 wherein, the outer portion has a plurality of fastener apertures.

14. The retaining ring of claim 10 further comprising a seal for the outer portion.

15. The retaining ring of claim 10 wherein, at least one section of the intermediate portion is cantilevered from the inner portion.

* * * * *

UNITED STATES PATENT AND TRADEMARK OFFICE
CERTIFICATE OF CORRECTION

PATENT NO. : 11,215,153 B1
APPLICATION NO. : 17/228261
DATED : January 4, 2022
INVENTOR(S) : Chila et al.

It is certified that error appears in the above-identified patent and that said Letters Patent is hereby corrected as shown below:

On the Title Page

Item (54), replace "RIM" with "RING" therefor.

In the Specification

In Column 1, Line 1, replace "RIM" with "RING" therefor.

In Column 1, Line 59, delete "illustrated an final" and insert --illustrates a final-- therefor.

In Column 2, Line 48, delete "assemble" and insert --assembly-- therefor.

In Column 2, Line 56, delete "16. upper" and insert --16, upper-- therefor.

In the Claims

In Column 3, Line 25, in Claim 2, delete "puma" and insert --pump-- therefor.

In Column 4, Line 2, in Claim 5, delete "portion in" and insert --portion is-- therefor.

Signed and Sealed this
Nineteenth Day of April, 2022

Katherine Kelly Vidal
*Director of the United States Patent and Trademark Office*